Oct. 4, 1960 H. L. BURNS 2,954,989
PNEUMATIC COMPENSATED PRESSURE SUIT JOINT
Filed Aug. 5, 1957

*INVENTOR.*
HENRY L. BURNS
*BY*
Cook and Schermerhorn
ATTORNEYS

United States Patent Office 2,954,989
Patented Oct. 4, 1960

2,954,989

PNEUMATIC COMPENSATED PRESSURE SUIT JOINT

Henry L. Burns, Rte. 1, Box 1162, Beaverton, Oreg.

Filed Aug. 5, 1957, Ser. No. 676,228

1 Claim. (Cl. 285—114)

This invention relates to an improved form of construction for an articulating joint in a flexible tubular member subject to internal fluid pressure. The invention is described and illustrated in connection with a knee or elbow joint in a pressurized high altitude suit but the principles of the invention are applicable to any articulating joint in a flexible tubular member subject to internal fluid pressure.

In a full pressure high altitude suit two of the major problems are joint flexibility and suit elongation with increasing pressure. Various types of articulating joints have heretofore been devised for such suits but they have not proven entirely satisfactory because of impediment to movements of the wearer, lack of elongation compensation, weight and rigidity in some instances and for various other reasons such as complicated pressure control mechanisms.

When a tube made of a flexible but non-elastic fabric, such as a sleeve or leg portion of a pressure suit, is inflated, the tube will remain in equilibrium while straight. When the tube is bent, one side must shorten or fold to accommodate the difference in arc length between the inside and the outside radii of the bend and a straightening force will result as a function of the area of this arc difference multiplied by the internal pressure. Hence, an effort is required to bend the tube and a constant effort must be exerted to maintain the tube in bent position. When this effort is relaxed, the tube will tend to straighten out.

According to the present invention, free flexibility of the joint for unopposed bending is obtained by the introduction of a compensating force which is also a function of the arc difference referred to. This is accomplished by placing a flexible fabric tube in the shape of a torus around the sleeve or trouser leg at the section where bending is desired and providing cords or tapes looped around such tube and secured to the sleeve at the edge of the bending section. The arrangement is such that when the main tube is bent the cords cross the compensating torus tube on the outside of the bend become tight and those across the compensating tube on the inside of the bend become slack whereby the compensating tube will increase in diameter at the inside of the bend and decrease in diameter at the outside of the bend. This operates to counter-balance the bending resistance of the main tube or sleeve by the application of certain principles which will be more fully explained in connection with the preferred embodiment illustrated in the drawing.

The general object of the present invention is, therefore, to provide an articulating joint of relatively simple construction having improved flexibility for a pressurized tubular member.

Another object is to provide a tube joint of the type described which is stable under pressure in either straight condition or flexed at any desired angle.

Another object is to provide a joint of the type described having full compensation against elongation.

Another object is to provide a pneumatic compensated articulating joint in a fluid pressure inflated tubular member which is operable by the same pressure that exists within the member.

Another object is to provide a tubular joint construction which will balance and neutralize the forces from internal fluid pressure that tend to straighten and rigidify the joint.

A further object is to provide an articulating joint which is relatively simple and inexpensive to make and can be made of readily available materials.

The invention will be more fully explained and additional objects and advantages will become apparent with reference to the accompanying drawing, illustrating a preferred embodiment, but it is to be understood that the drawing is not intended to limit the invention as it is merely illustrative of the principles involved. Other specific forms of construction will occur to persons skilled in the art and all such modifications within the scope of the appended claim are included in the invention.

In the drawings:

Figure 1 is a fragmentary sectional view of a preferred embodiment of the invention illustrating the details of construction;

Figure 2, on a reduced scale, illustrates diagrammatically the invention in a joint with the joint in a straight condition;

Figure 1:
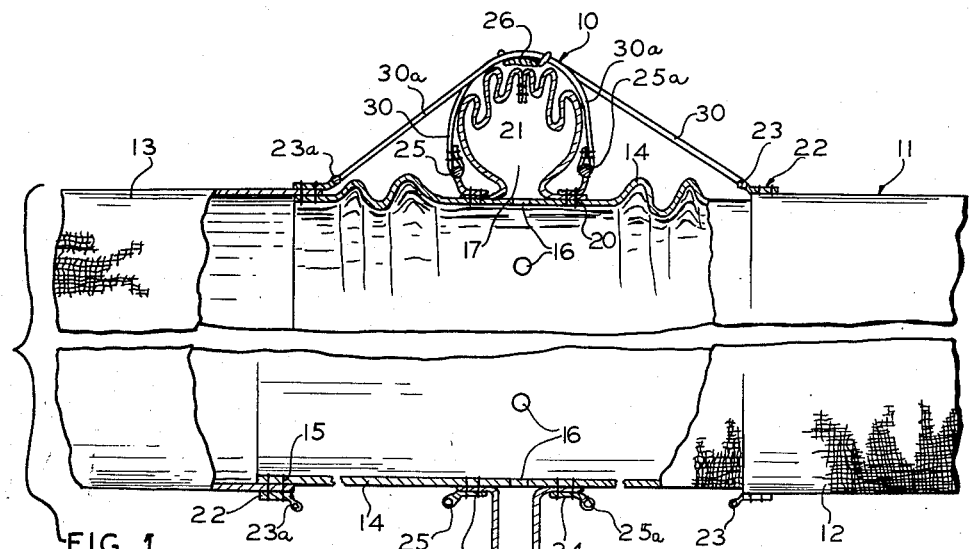

Prior to discussing the details of construction of the preferred embodiment of the invention, there will be presented a generalized description of the same. In achieving the objects of this invention consider a flexible, non-elastic, air tight, compensating tube in the configuration of a torus placed around a sleeve where bending takes place. Looped around this tube are cords or tape extending longitudinally of the sleeve and tied to the sleeve at spaced points in the region of the bending section, see Figure 1. When the sleeve is bent, without being inflated, the cords on the outside of the bend become taut and those on the inside of the bend become slack.

If the flexible fabric tube is pressurized and fabricated so that non-elastic expansion and contraction are allowed, the compensating tube will increase in diameter on the inside of the bend and decrease in diameter on the outside of the bend. This is brought about because the ends of the cords on the inside of the bend are moved toward each other and thereby let the tube expand and the cords on the outside of the bend are moved away from each other and contract the tube. The tension on the cords exerted by the compensating tube will tend to counteract the bending resistance of the sleeve, said bending resistance being a function of the internal pressure of the fluid in the sleeve. This counter-balance is brought about because the circumferential or hoop tension of the tube is a direct function of the tube diameter, because the compensating tube diameter will increase and decrease as an inverse function of the arc length, and because resistance due to bending of the sleeve will be a direct result of the difference in arc lengths on the inside and outside of the bend.

Referring to the drawing, it is seen that the invention comprises an articulating joint 10. In the drawing this joint is spliced or inserted in the tubular arm portion 11 between the upper arm 12 and the forearm 13. The joint portion comprises flexible material 14 in lap joint construction with said arm portions. These materials are sewn together by threads 15. Prior to sewing there may be added rubber cement or other suitable sealing material to one or the other faces of the materials so as to form an air tight or sealed joint. In a circular pattern running around the joint are one or more openings 16. Overlying these openings is a chamber 17 which may be composed of the same material as material used in 14. A suitable material for all of the parts 11, 13, 14 and 17 is a tight weave rubberized fabric which will not leak air through the fabric.

More particularly, the chamber 17 is made by sewing the inner edges of two annular bands of flexible material 18 on opposite sides of opening 16 and sealing the two free outer edges of the flexible material together so as to provide a leak-proof chamber. For ease of construction, the edges of this band flange outwardly from the chamber proper and are sewn by threads 20 to the material 18. In the sewing operation there may be employed rubber cement to make an air tight seal between the chamber material and the joint material. In the particular illustration in Figure 1 the outer edges of the bands are stitched together by threads 21. However, it is to be realized that the chamber can be made in other ways.

Overlying the lap joints between the sleeve portions 12 and 13 and the material 14 is a band or tape 22 having cord loops or eyelets 23 therein. This band is sewn securely to both the sleeve and to the joint. Also, overlying the flanges of the bands 18 and the material 14 are similar bands of tape 24 having cord loops or eyelets 25 therein. Again, this tape is sewn to both the chamber material 18 and the joint material 14.

Overlying the pressure chamber and made from a substantially non-stretchable but flexible material is a tape band 26 of canvas or the like. This band is not attached to the pressure chamber but along each edge are provided a number of guide loops 27 and 28 which hold it in place after assembly.

Further, in the construction of the joint there are employed two lacing cords 30 and 31 trained through the various cord loops or eyelets just described. The cords 30 and 31 are anchored by tying in the cord loops 23 and 23a and pass slidably through cord loops 25, 25a, 27 and 28. Cord loops 23, 23a, 25 and 25a constitute anchor points and cord loops 27 and 28 constitute guide points.

Starting at an anchor 23 on one side of the joint, cord 30 is tied therein, then passes loosely through the guide 27, loops through an anchor loop 25 but is not tied therein, returns loosely through an adjacent guide 27 and ties into another anchor point 23 spaced two anchor points away from the starting point. Cord 30 continues thus in a zigzag course twice around the sleeve until it is tied at each anchor point 23 and looped through each anchor loop 25.

Similarly, a cord 31 is tied into a starting anchor loop 23a, passes loosely through guide loop 28, loops around an anchor loop 25a on the opposite side of the chamber, returns loosely through a guide loop 28, and ties into an anchor loop 23a two eyelets away from the starting point. Cord 31 continues in this manner in a zigzag course twice around the sleeve until it is tied at each anchor point 23a and looped through each anchor loop 25a. The cords 30 and 31 in passing through the guide loops 27 and 28 are positioned by the same to prevent bunching of the cords so that the pressure chamber will not bulge out in spaces between the cords.

The lower side of the view in Figure 1 is utilized to show the construction of compensating chamber 17 before the band 24 and cords 30 and 31 are assembled on the joint. The upper side of the view shows the assembled device under pressure with the sleeve and chamber 17 inflated and the joint unbent. Cords 30 and 31 are of such length between their tie points that slack folds are held in material 14 and 18 when the joint is not bent. Thus, chamber 17, or portions thereof, can expand or contract in diameter as the cord anchor points are moved closer together or farther apart by the bending of the joint. The extra sleeve material gathered at 14 in the bending section also has the advantage of decreasing the resistance to twisting of the forearm and like movements.

Figure 2:
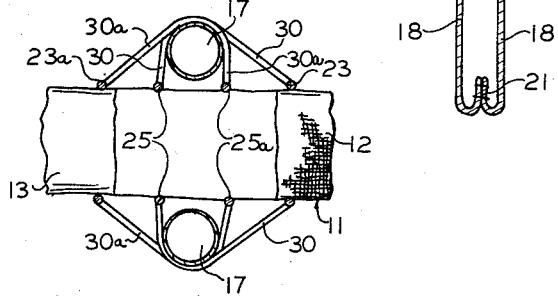

Turning now to the actual use of this joint, it is seen that in Figure 2 there is shown diagrammatically a joint in a straight or unbent condition. In cross sectional view the chamber 17 is of a substantially circular configuration of uniform diameter around the sleeve. The cords 30 and 31 maintain it in that approximate configuration.

Figure 3:
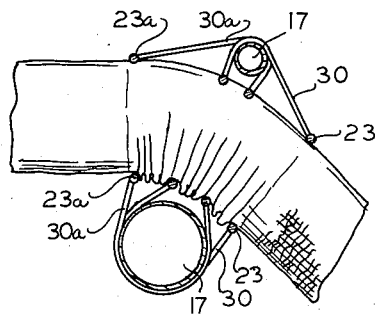
Figure 3 illustrates the invention when the joint is bent.
Figure 4:
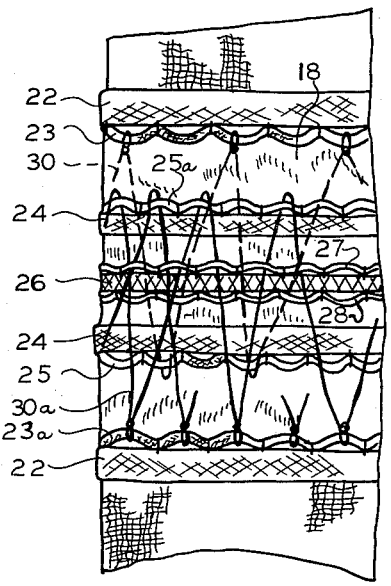
Figure 4 is an elevation view of the joint.

Upon the sleeve portion being bent, as shown in Figure 3, that part of the chamber on the inside of the bend increases in diameter and that part of the chamber on the outside of the bend decreases in diameter. On the inside of the bend the anchor points 23 are brought closer to anchor points 25 and anchor points 23a are brought closer to anchor points 25a, slacking the cords 30 and 31 and allowing that portion of the chamber 17 to increase in diameter. On the outside of the bend these anchor points are moved farther apart, tensioning the cords 30 and 31 and contracting that portion of chamber 17 to a smaller diameter since chamber 17 is substantially encircled by the cords.

Thus, the circumferential tension in the compensating chamber tube, which is a function of the tube diameter, is transferred to the cords in varying amount around the joint to produce a large tension force on the inside of the bend and a small tension force on the outside of the bend, longitudinally of the sleeve. With the use of the present device the joint may be bent under pressure without appreciable effort and once bent it will stay in that position without any tendency to straighten out.

Although I have described my invention with respect to a chamber in the configuration of a torus completely encircling a joint member, it is to be realized that in the case of a joint which can swing in only one plane the compensating chamber may be divided into two sections on opposite sides of the joint. For example, on the outside of an elbow joint there may be a section extending through an arc of 120° around the joint and on the inside of the joint there may be a section extending through an arc of 120° around the joint. In this manner the compensating chamber may be eliminated at the sides of the joint on the hinge axis for greater freedom of movement of the body and limbs.

Other examples are with the knee, the shoulder and the waist. In regard to the knee, there may be used a torus encircling the knee or two separate chambers. For the shoulder there may be used one encircling chamber in the configuration of a torus for compensation in universal movement or there may be used a pair of chambers for compensation in one plane of movement only. In the latter example there may be a chamber on the front of the shoulder and one on the back, which act in conjunction with each other so that the arm may be moved freely forward or backward. However, if desired, there may also be a chamber underneath and a chamber on top so that the arm may be raised and lowered without excessive discomfort. With these chambers on the shoulder it is to be realized that they act in conjunction with each other and are located in the plane of the movement desired.

As for the waist, there may be a chamber encircling the waist or separate chambers in front and back. With the chamber encircling the waist an individual can bend freely in any direction without having the straightening out effect counter-acting the bending. With the chamber in front and back an individual may bend forward freely but may not lean to the side without effort. In both the shoulder and waist joints horseshoe-shaped chambers may be used to advantage. In any location where a suit closure fastening device crosses a compensating chamber, the torus tube need not be a complete circle.

In regard to the construction of the compensating chambers, the chamber may be attached to the joint as illustrated in the drawings of this application. Also, the chambers need not be connected directly with the suit but may be held in position by the tension cords or other means. In all cases the compensating chambers are preferably inflated by communication with the air pressure in the suit.

On a shoulder joint where considerable rotation as well as bending is required, orientation of the compensating tube with respect to the axis of rotative motion can be translated into a bending action insofar as the compensating action of the joint is concerned.

Unopposed flexing of the joint is attained by proper selection of compensating tube diameter and air pressure therein. For obvious reasons of simplicity it is advantageous to use suit pressure in the compensating tube, this being obtained by a simple pressure transfer connection as described. Optimum compensating tube diameter is determined by the elongation forces produced within the sleeve. An approximation of optimum compensating tube diameter D with respect to a given sleeve diameter $d$ may be calculated as follows:

Let an air pressure P be interconnected and identical within the sleeve and the compensating tube.

Let there be one tension cord for each inch of sleeve circumference and consider the elongation and tension balance for one cord loop.

The elongation force per cord will be equal to:

$$\text{Force per cord} = \frac{\frac{\pi d^2}{4} P}{\pi d} = \frac{dP}{4}$$

The accepted formula for circumferential tension in a cylinder is $DP/2$ but for this torus the tension is greater than this because of the increased area around the outside, and the compensation force per cord may be approximated as:

$$\text{Compensating force} = \frac{DP}{1.5}$$

At the balance point when elongation force equals the compensating force:

$$\frac{dP}{4} = \frac{DP}{1.5}$$

which is reduced to formula $$d = 2.67D \tag{1}$$

That is, when the sleeve tube diameter is about 2.7 times the compensating tube diameter the elongation forces will have a minimum influence on flexing resistance. In regard to the mechanical design and actual construction of a test joint with a sleeve diameter of four inches from Formula 1 the compensating tube diameter in the normal or straight position should be on the order of one and one-half inches in diameter. Designing for a maximum of a sixty degree bend around a six inch outside radius the outside sleeve arc will be six and three-tenths inches and the inside arc will be two and one-tenth inches. If the sleeve bending section is designed at six and one-half inches and the tension cord length set at nine inches, the compensating tube will collapse to approximately eight-tenths inch diameter at its outermost point of the sleeve bend and will expand to approximately two and two-tenths diameter at its innermost point. Thus, the compensating tube must contain enough material to allow expansion to two and two-tenths inches diameter (six and nine-tenths inches circumference). Further, since this tube can expand outward only, the method of attachment to the sleeve and method of looping the tension cords must be included in the design considerations.

In the construction of my articulating joint I use a rubberized cloth, a conventional lacing anchor tape and a nylon cord lacing. The degree of elongation of the nylon cord lacing was less than the degree of elongation in the materials used in the sleeve or leg, whereby elongation of jointed members of the suit is prevented. With such cords the sliding friction is negligible and is not taken into consideration in the foregoing equations.

Other arrangements may be devised for transmitting the hoop tension in the compensating chamber to the tension cords and for holding the tension cords properly spaced where they overlie the compensating chamber so that the cords will not bunch together and permit the compensating chamber to bulge out in gaps between them. For example, the lacing may be so arranged that spacing band 26 is not necessary. Also, it is not necessary for the tension cords themselves to wrap around the compensating chamber for attachment at the anchor points 25 and 25a adjacent the material 14. The tapes 24 may, for example, have outstanding free edge or flange portions themselves wrapping part way around opposite sides of the compensating chamber and equipped with anchor points for the tension cords at a distance from the material 14. Such an arrangement provides a partial envelope for the compensating chamber and places the anchor points 25 and 25a close enough together to avoid bunching of the cords over the top of the compensating chamber. It will be appreciated that it is desirable in any case to connect the anchor points 25 and 25a with some element other than the material 18 of the compensating chamber to avoid air leakage while at the same time producing the same mechanical result as if the tension cords were connected directly with the skin of chamber 17.

Having now described my invention and in what manner the same may be used, what I claim as new and desire to protect by Letters Patent is:

A fluid pressure compensated articulating joint for a flexible tubular member subjected to internal fluid pressure and subject to bending in at least one plane comprising a fluid pressure chamber extending exteriorly around at least a portion of the circumference of said tubular member on diametrically opposite sides of the joint in the plane of the bend, said chamber being formed of flexible, inelastic material capable of wrinkling and folding under external restraint to vary the diametral and circumferential dimensions of the chamber, and a plurality of flexible tension members overlying and wrapping tightly around and in contact with said chamber in closely spaced side-by-side relation substantially enveloping said chamber to restrain the expansion thereof and be tensioned thereby, each tension member being anchored at one end to said tubular member at a distance from one side of said chamber and anchored at its other end to said tubular member adjacent the opposite side of said chamber, said tension members extending in opposite directions longitudinally of the tubular member to contract the diametral and circumferential dimensions of said chamber when said joint is bent away from said chamber and permit expansion of said chamber dimensions when said joint is bent toward said chamber.

References Cited in the file of this patent

UNITED STATES PATENTS

| | | |
|---|---|---|
| 514,266 | Landis | Feb. 6, 1894 |
| 809,903 | Bowers | Jan. 9, 1906 |
| 1,076,738 | Berry | Oct. 28, 1913 |
| 1,305,656 | Long | June 3, 1919 |
| 2,410,632 | Colley | Nov. 5, 1946 |
| 2,433,768 | Krupp | Dec. 30, 1947 |
| 2,613,087 | Alford | Oct. 7, 1952 |
| 2,676,038 | McConnell | Apr. 20, 1954 |

FOREIGN PATENTS

| | | |
|---|---|---|
| 695,015 | Great Britain | Aug. 5, 1953 |